April 24, 1934.  H. J. FERGUSON  1,955,876
COUPLING HOOK MECHANISM
Filed Jan. 11, 1933  3 Sheets-Sheet 1
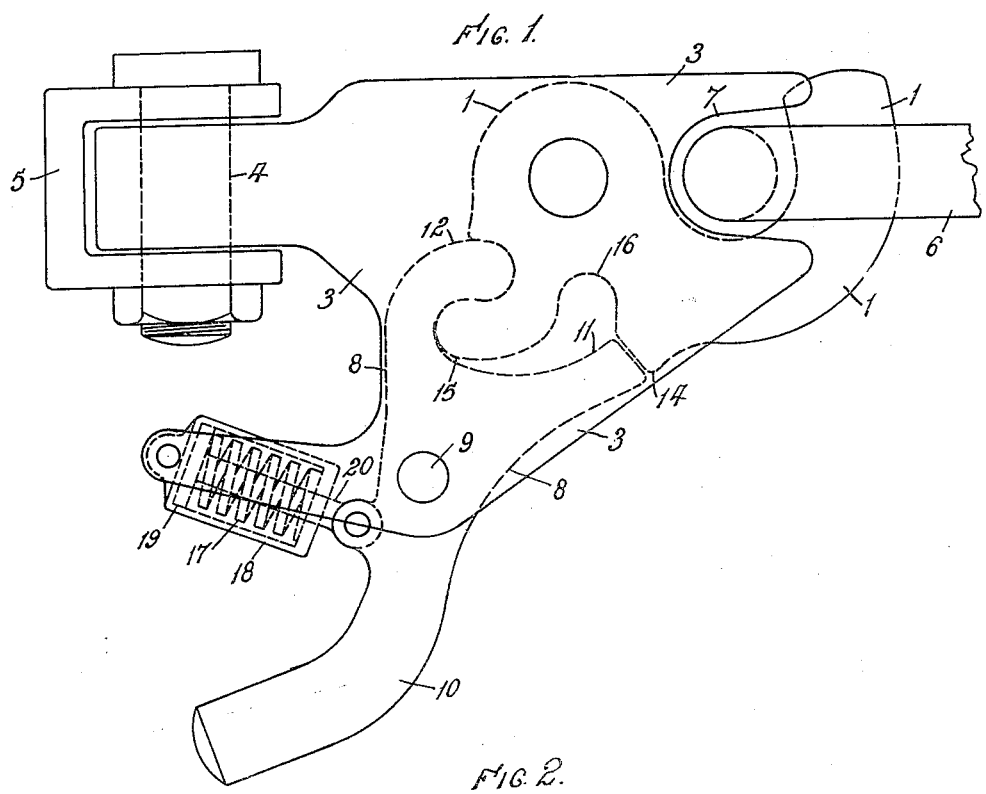
Inventor
H. J. Ferguson
Atty.

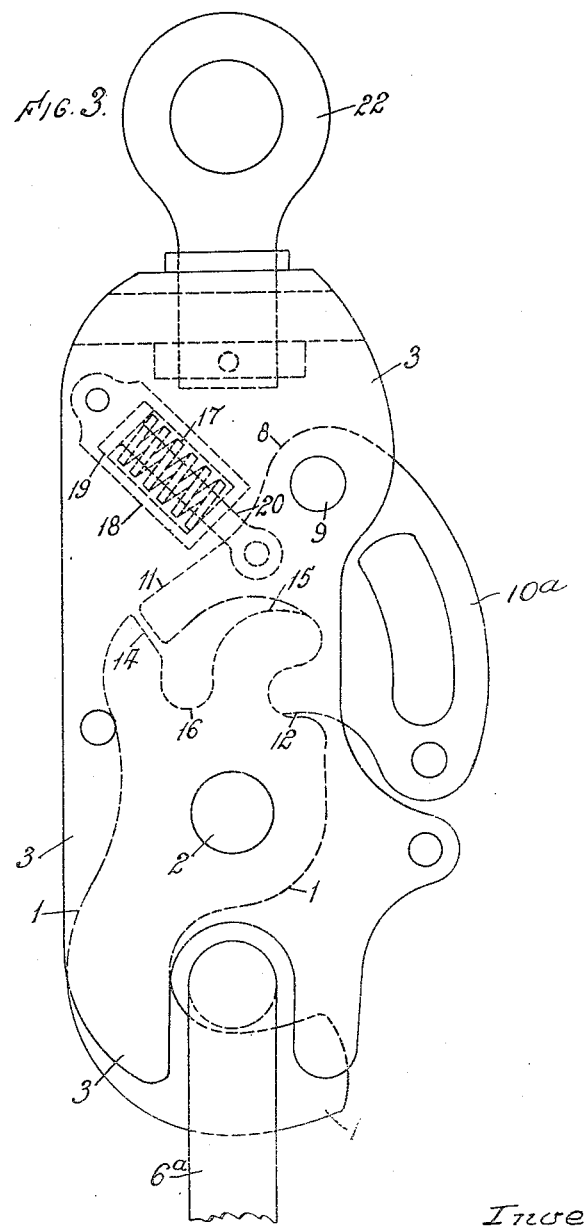

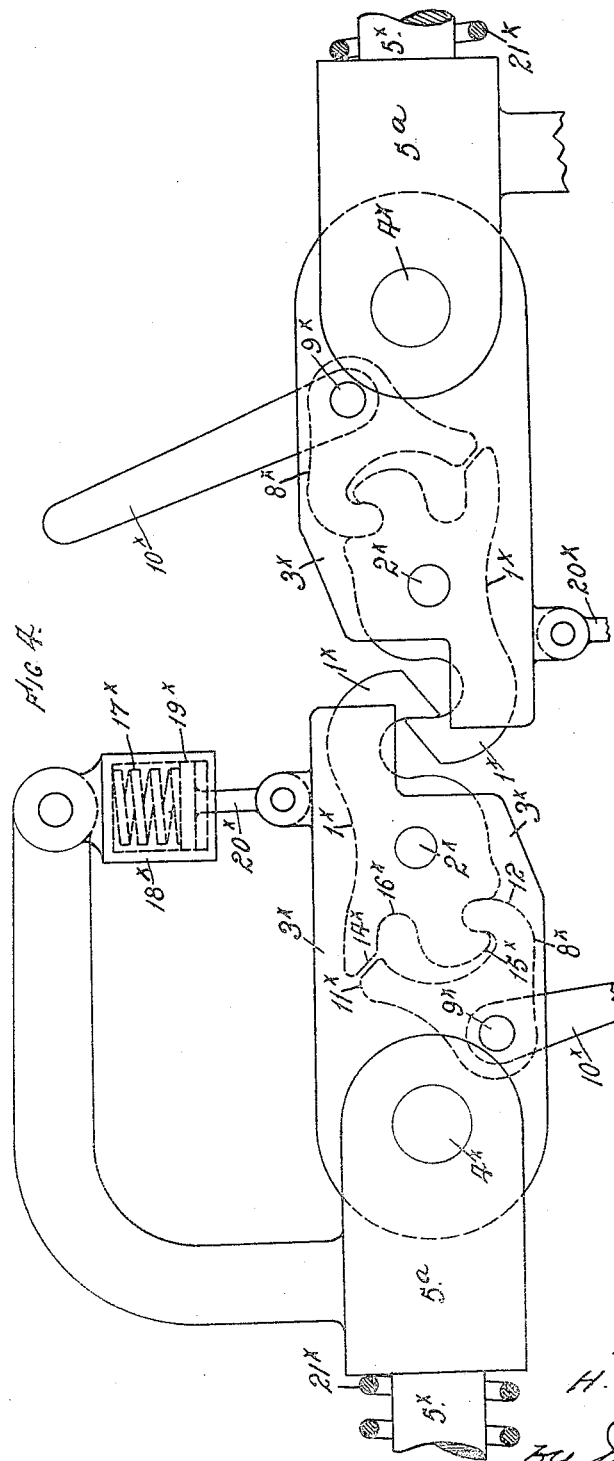

Patented Apr. 24, 1934

1,955,876

UNITED STATES PATENT OFFICE 1,955,876

COUPLING HOOK MECHANISM

Herbert James Ferguson, Great Crosby, Liverpool, England

Application January 11, 1933, Serial No. 651,199
In Great Britain January 7, 1932

3 Claims. (Cl. 213—179)

This invention has reference to hook couplings used in connection with vehicles, either for rail, or road use, in which two or more vehicles are connected together by the coupling which is adapted to be readily engaged with a link or the like of another vehicle, and disengaged therefrom; or it can be used for slipping or releasing suspended bodies, such for instance as buoys used for sea and other channels and navigation generally, and for releasing and holding binding devices such as those for holding down boats on ships' decks, and other similar objects, where it is desired that they can be readily released when required.

The kind of coupling to which this invention more particularly relates is that in which the hook proper is pivoted between carrier plates or the like, in which there is a cut-out part or gap through which a ring shackle or the like can be passed, so that when the hook is turned round about its pivot, its point can be passed through the ring or shackle; the hook being operated and held in its operative position by a hand operated part which acts on a part of the hook at a point remote from the hook portion proper.

One of the objects of the invention is to provide a coupling hook mechanism which will be positively locked without any coupling engagement with another hook or coupling member, and which will be positively unlocked when operated to uncouple the hook from the said member.

Another object of the invention is to provide a coupling mechanism which can be operated by remote control to effect positive locking and unlocking of the coupling mechanism.

With these and other objects in view, which will appear from the description following hereafter, a coupling hook mechanism according to this invention comprises hook carrier side cheeks in which the hook is pivoted, a hinged trigger device pivoted in the said cheeks and having two parts adapted to engage the hook at two points spaced apart, one of the trigger parts constituting a strut adapted to hold the hook in the engaged position of the coupling, and this strut part is also adapted when the hinged hook trigger device is operated in the releasing action to act on a part of the hook, and press it about its pivot to the disengaged position; the other trigger part being adapted to engage the hook and hold the strut part in the position in which the hook is in its engaged position with the coupling.

As a modification, the coupling may be constructed so that it will have a snap-action, in which case the carrier cheeks are pivoted to a fixed member attached for example to a vehicle, and connected between the hook carrier side cheeks and the fixed member is a spring adapted to resist the movement of the cheeks in one direction, so that when a link or the like, which is to be engaged with the hook is pressed against same, the hook will be moved back about its pivot against the action of the spring, and when the link has completely passed over the hook the spring will react and move the hook into complete engagement with the link.

The invention is illustrated by the annexed drawings, in which Figures 1 and 2 are elevation and plan showing a road or rail wagon or like coupling. Figure 3 is an elevation showing the hook or invention applied as a hook for releasing buoys. Figure 4 is a plan illustrating the manner of operation of automatically effecting the engagement of the couplings.

Referring to the drawings, 1 is the hook proper which is pivoted on the pin 2, carried in the two carrier cheeks 3 which are joined together at the leading end and carried on a vertical pin 4 carried in a jaw 5 on or attached to the chassis of the propelling vehicle.

The coupling link of the trailer with which the hook 1 engages is marked 6, and may be assumed to be in the form of a link suitably attached to the trailer and when in position for engagement its leading end will lie in gaps 7 in the rear end of the cheeks 3, whilst the end of the hook 1 projects up through the trailer link as shown, the forward end of the trailer link 6 being held, so far as vertical movement is concerned by the bottom and top of the jaws 7 in the end of the cheeks 3.

It will be thus seen that the whole movement of the hook 1 is about the pin 2.

The part of the hook 1 below the pin 2 is made of the form shown, and in connection with these parts the hand operated hinged trigger device 8 operates, it being hinged in and carried by the cheeks 3 by a hinge pin 9, and operated by a handle 10 which is in one with it.

The trigger 8 comprises a strut 11 and a hook engaging part 12, the latter operating in connection with a gap in the back end of the hook, and the strut portion operating in connection with the heel portion 14 of the hook.

The heel 12 engages a downwardly and outwardly projecting hook portion 15 formed on the back of the hook 1, and so when the hook trigger parts 12 and 15 are in the position shown, the strut will prevent the hook 1 from revolving round its pivot 2, the strut being held in engagement with the hook part 14 by the trigger hook part 12.

Between the heel 14 of the hook 1 and the hook 15 there is a recess 16 in the main hook, into which the outer end of the strut 11 can move, when the trigger is removed from the hook, and so enabling the hook to fall and turn round its pivot 2.

When the hook 1 is moved up and its end passed through the trailer link 6 it will be rigidly held in this position by the trigger, the normal position of which is its locking position, this locking being effected by a spring 17 which is held in a cylinder 18 and its upper end presses on a piston 19 in the cylinder, which is connected to the trigger by a rod 20.

Regarding the buoy releasing hook device shown in Figure 3, the hook and hinged trigger device and other parts are marked with the same figures of reference as those used in connection with the hook apparatus described with reference to and shown in Figures 1 and 2, but in this case the link or ring $6^a$ is that of the buoy to which the coupling is attached when it is being launched or lowered into the water and then released.

In this apparatus the whole of it is suspended say from the falls or tackle of a crane or davit by a swivel eye 22. The engaging and releasing operations are the same as those described with reference to the other figures of the drawings, and the trigger lever or handle $10^a$ may be operated by a shackle, the pin of which passes through it, and is adapted to be operated at a distance by a cord or chain.

In the construction shown in Figure 4 the coupling is adapted to automatically operate when two vehicles are to be coupled together.

The coupling device consisting of the carrier cheeks $3^x$, hook $1^x$, and trigger device $8^x$ is pivoted on the pin $4^x$ which is mounted and carried in a head $5^a$ supported on a rod $5^x$ which is carried by the frame of the vehicle and is normally pressed out by a spring 21. The trigger $8^x$ supporting and operating pivot $9^x$ may be the end of a rod, which extends from the trigger to the side of the vehicle from which it may be operated by a handle $10^x$.

The cheek plates $3^x$, with the hook $1^x$ and trigger $8^x$, carried in them, are pressed in one direction about the pivot $4^x$ by a spring device similar to that described with reference to Figures 1 and 2, the hook and trigger also being similar to those described with reference to these figures.

When the vehicles are to be coupled up, the hook $1^x$ and the trigger $8^x$ are brought into engagement by the operation of the handle $10^x$, the couplings on the ends of the vehicle are then pushed onto one another, and their noses being inclined or curved as shown will cause the hooks and the cheek plates to be pressed back about the pivot $4^x$ against the pressure of the spring $17^x$, and when the two hooks have passed each other, the springs will react and the hooks will engage each other. To disengage them and so release the vehicles from one another, the triggers are moved by their operating handles $10^x$ so that the hooks may move away from each other about their pivots $2^x$, whereupon the two vehicles are free of one another.

What is claimed is:—

1. A coupling hook mechanism having hook carrier side cheeks, a hook proper pivoted in the said cheeks, and a hinged trigger device having two parts adapted to engage the hook at two different points spaced apart, one of the trigger parts being a strut adapted to hold the hook in the engaged position of the coupling, in which position it acts as a strut, and when the trigger is operated in the releasing action, the said strut part acts on a part of the hook and presses it about its pivot to the disengaged position, the other trigger part being adapted to engage the hook and to hold the strut part in the position in which the hook is in its engaged position with the coupling.

2. A coupling hook mechanism having hook carrier side cheeks, a hook proper pivoted in the said cheeks, and a hook trigger device having two parts adapted to engage the hook at two different points spaced apart, one of the trigger parts being a strut adapted to hold the hook in the engaged position, in which position it acts as a strut and when the trigger is operated in the releasing action the said strut part acts on a part of the hook and presses the hook about its pivot to the disengaged position, the other trigger part being adapted to engage the hook and to hold the strut part in the position in which the hook is in its engaged position with the coupling, and a spring adapted to normally pull the trigger into engagement with the hook.

3. A coupling hook mechanism for effecting a snap-action coupling, comprising hook carrier side cheeks, a fixed member attached to a vehicle, a pivotal connection between the said fixed member and the said side cheeks, a spring located between the said fixed member and the said cheeks to impart a snap-action locking movement to the said cheeks, a hook proper pivoted in the said cheeks, and a hinged hook trigger device having two parts adapted to engage the hook at two different points spaced apart, one of the trigger parts being a strut adapted to hold the hook in the engaged position of the coupling in which position it acts as a strut and when the trigger is operated in the releasing action the said strut part acts on a part of the hook and presses it about its pivot to the disengaged position, the other trigger part being adapted to engage the hook and to hold the strut part in the position in which the hook is in its engaged position.

HERBERT JAMES FERGUSON.